INVENTORS.
HAROLD R. BECK
JAMES B. SWETT
BY
Paul R. Wylie
ATTORNEY

Oct. 13, 1970    H. R. BECK ETAL    3,533,593
MOLD FOR CONGEALABLE FOODSTUFFS AND THE LIKE
Filed Aug. 10, 1967    2 Sheets-Sheet 2

INVENTORS.
HAROLD R. BECK
JAMES B. SWETT
BY
Paul R. Wylie
ATTORNEY

United States Patent Office 3,533,593
Patented Oct. 13, 1970

3,533,593
MOLD FOR CONGEALABLE FOODSTUFFS AND THE LIKE
Harold R. Beck, Woodland Hills, Calif., and James B. Swett, Barrington, R.I., assignors to Dart Industries Inc., Los Angeles, Calif., a corporation of Delaware
Filed Aug. 10, 1967, Ser. No. 659,735
Int. Cl. B41b 11/62
U.S. Cl. 249—104                          7 Claims

ABSTRACT OF THE DISCLOSURE

An individual serving sized plastic salad mold particularly well adapted for use with gelatin and having a reversible decorative impression forming closure.

---

This invention relates generally to molds for gelatinous or congealable materials that are poured into mold in liquid or semi-liquid form and solidified therein to form a shape retaining molded product. More specifically, the invention relates to a mold that is particularly useful in the formation and storing of food products such as gelatin desserts. The invention also relates to closuring and attachment means useful with such molds.

It is an object of this invention to provide a mold of the foregoing type that will be adapted to form products of various ornamental configurations utilizing as few components as possible.

It is a further object of this invention to provide a mold and closure therefor, wherein the closure can be simply reversed to adapt the mold to form a product having a different design than that formed when the mold is in a normal position.

A further object of this invention, in a specific embodiment thereof, is the provision of an individual serving-sized food mold.

A still further object is the provision of a non-screw type reversible closuring and attachment member for use with a mold and other hollow bodied articles.

These and other objects will be apparent from the following description of the invention and the accompanying drawings showing a specific embodiment thereof.

Figure 4:
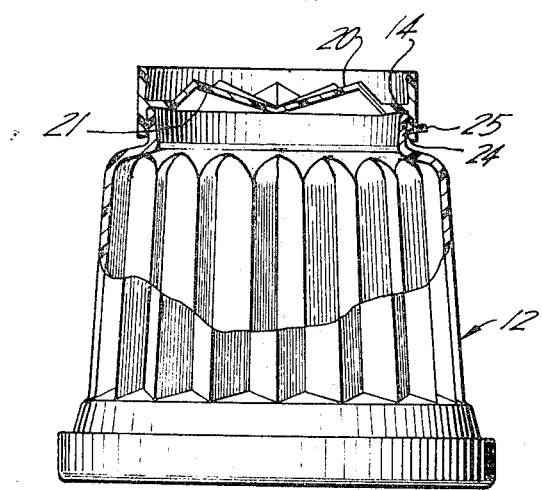
FIG. 4 is a fragmentary side elevation view of the mold of FIG. 1, with the broken away portion thereof shown in cross-section for convenience of illustration.
Figure 3:
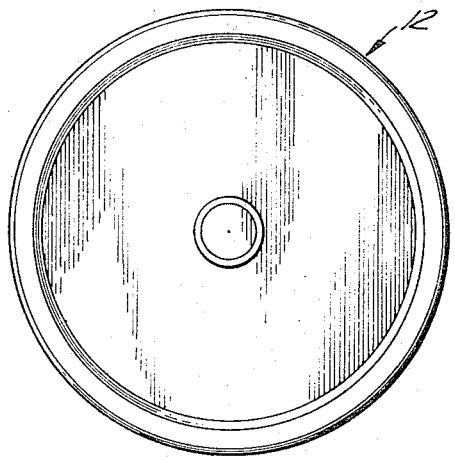
FIG. 3 is a bottom plan view of the lower closure of the mold of FIG. 1.

Referring now to the drawings, the mold shown generally at 10 comprises a reversible closuring member 11, central mold portion 12 and large end closure 13. Both of the closures 11 and 13 are outwardly removable from the central mold portion 12. As best seen in FIG. 4, the central mold is formed as a hollow body having generally uniform wall thickness.

Closures 11 and 13 are of sufficient diameter to permit shelving or storing of the mold 10 with either closure serving as the base. In the embodiment shown, the ratio of diameters of the large end closure to the upper reversible closuring member are such that tipping cannot easily occur and the mold can be stored in non-rockable position on the reversible small end closure 11 without danger of being knocked over by an inadvertent action such as might occur if several of the molds were placed in storage together.

Reversible closure member 11 is formed with an imperforate central wall portion 14. A peripheral sleeve forming band 15 is formed integrally with the wall portion 14. The band comprises side wall portions 16 extending both outwardly and inwardly from the central wall portion. A continuous peripheral undercut portion 17 is located adjacent the wall portion 14 on the inside of band 15. Extending outwardly of the undercut portion 17 on both sides of wall 14 is a continuous inwardly projecting portion 18, terminating in curved lead-in radius 19.

Figure 5:
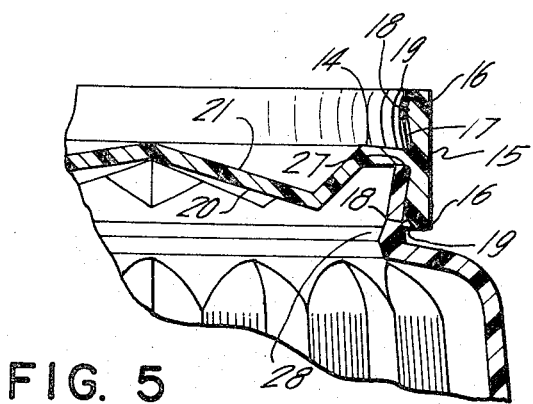
FIG. 5 is an enlarged view in cross section of the upper closure and central mold portion shown in FIG. 4, showing details of construction of the central mold and upper closure interface with the closure in a reversed position from that shown in FIG. 4.
Figure 6:
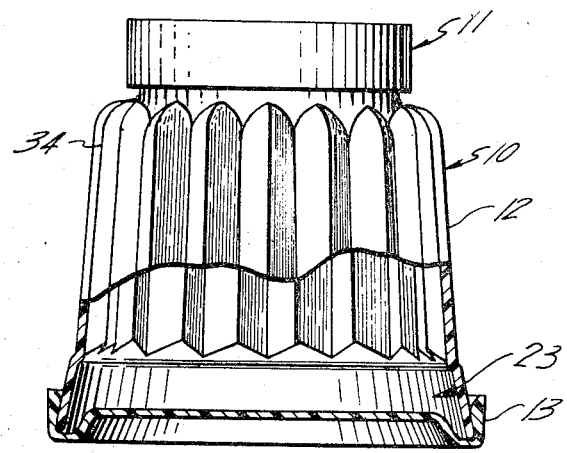
FIG. 6 is a view similar to FIG. 4, showing details of construction of the central mold and lower closure interface; and, FIG. 7 is an enlarged cross-sectioned view of the central mold and lower closure interface showing details of construction thereof.

In the embodiment shown, central wall portion 14 is formed integrally with protruding contour 20 and indented contour 21. These contours are provided for the purpose of adapting the mold to form a different design on the molded product when a closure is reversed than the design that would be formed when the closure is installed in a normal position. As best seen in FIG. 5, protruding contour 20 and indented contour 21 are simply the corresponding complementary configuration of each other, such contours being formed by a single wall of uniform thickness.

Figure 1:
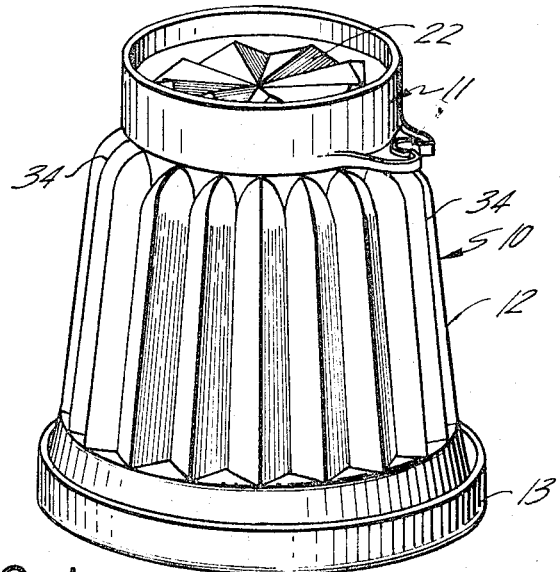
FIG. 1 is a view in perspective showing an assembled mold according to the invention.
Figure 2:
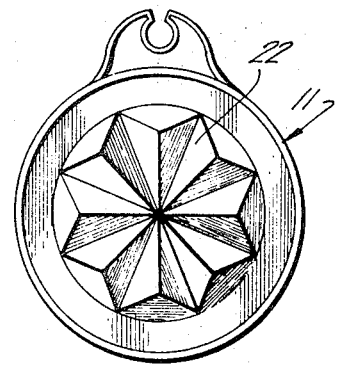
FIG. 2 is a top plan view of the upper closure of the mold shown in FIG. 1.

As can best be seen in FIGS. 1 and 2, the contours 22 of the reversible closuring member 11 are of polyangular configuration. The particular polyangular configuration shown not only provides an aesthetically pleasing design to the final molded product; but additionally, due to the absence of sharp angles, the configuration shown permits easy removal of the closure without marring the upper surface of the molded product. As will be evident from the several figures of the drawings, all the angles in the polyangular configuration are generally obtuse.

Reversible closuring member 11 has separate utility apart from a mold closure in that it can serve as a coupling or attachment member for two hollow-bodied or tubular members.

Central mold portion 12 of hollow body formation is smoothly contoured from large end opening 23 to small end opening 24. The small end opening terminates in a peripheral edge portion, shown generally at 25, that is adapted to receive reversible closuring member 11 in liquid tight sealing relationship. In the embodiment shown, the peripheral edge portion 25 terminates in outwardly flared, upwardly extending flange 26. The flange has a continuous flat surfaced circumferential edge 27 at the upper periphery thereof.

The inner diameter of projecting portion 18 of the reversible closuring member 11 is smaller than the outside diameter of outwardly flared upstanding flange 26. Thus, a snap-fit between the reversible closure member 11 and the mold 12 is obtainable. The liquid tight interface between the reversible closure member and central mold portion is best seen in FIG. 5. As shown, outwardly flared upwardly extending flange 26 leans outwardly at an angle of about 9°. With the angular relationship shown, tight fit between closure 11 and flange 26 are obtained, while at the same time undercutting of the molded product by the bottom portion 28 of the flange will not hinder removal of the product from the mold.

Figure 7:
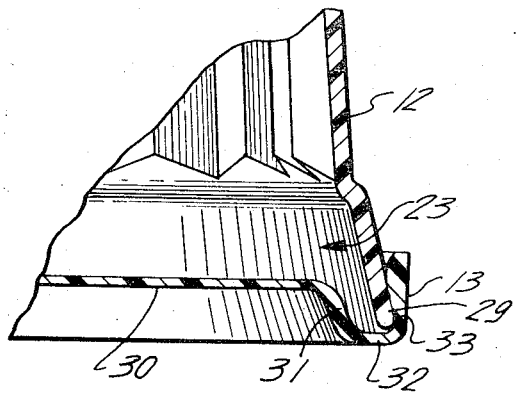

The large end opening 23 of central wall portion 12 terminates in an outwardly flared flange. Large end closure 13 is formed of a central imperforate wall portion 30, terminating in a U-shaped portion formed with an inside wall 31, connecting wall 32 and outside wall 33. The U-shaped portion is adapted to fit over the peripheral flange 29 in liquid and moisture sealing relationship, as can best be seen in FIG. 7.

Reversible closure member 11 can be formed of a relatively flexible material such as low density polyethylene, and the mold portion can be formed of a stiffer yet flexible material such as a high density linear polyethylene, or polypropylene.

In the embodiment shown, peripheral sleeve forming band 15 of the upper reversible closuring member 11, in addition to forming closuring members on each side of imperforate wall 14, stiffens the closure and thereby aids the attainment of a firm, liquid tight seal between the closure and the central mold portion.

Ceneral mold portion 12 is formed with externally protruding flutes 34, designed to form decorative patterns on a molded product, as well as to permit easy release thereof from the mold member.

In operation, the mold as described and shown in the drawings performs in the following manner: Reversible closuring member 11 is installed on central mold portion 12, and the thus assembled closure and mold are inverted to rest upon the small end closure. A liquid of the type that solidifies in the mold to form a shape-retaining solid mold is poured in the mold to the desired level, and then large end closure 13 is installed to prevent moisture ingress or egress, as well as spillage when the assembled mold is moved. When the molded product is finally solidified, large end closure 13 is removed and central mold portion with the still assembled reversible closuring member 11 is inverted. Closure 11 is then removed to equalize air pressure on the mold contents which can then be easily removed.

Although a variety of substances can be formed in the mold, it has been found to be particularly advantageous for gelatin type desserts, in that such materials adhere tightly to the side walls of the container in which they are formed. The pressure equalization feature described renders the novel mold particularly useful from the standpoint of ease of removal of such products.

Reasonable modification and variation of the foregoing described invention are possible without departing from the scope thereof as defined by the following claims.

We claim:
1. A mold for foodstuffs and the like comprising a central mold portion having walls terminating at an opening thereof in a peripheral edge portion and a reversible closure member for said mold, including an imperforate central wall, a peripheral sleeve forming band having side wall portions thereof extending both upwardly and downwardly from said central wall whereby a first closure is formed on one side of said central wall and a second closure is formed on the other side thereof, said side walls being adapted to form a liquid tight seal when installed in sleeve arrangement on said peripheral edge portion.

2. A mold for foodstuffs and the like as defined in claim 1, wherein said closure is formed from a plastic material.

3. A mold for foodstuffs and the like as defined in claim 2, wherein said central wall has different contours on either side thereof whereby a design different from that formed on the molded product when the closure is installed in a normal position will be formed thereon when the closure is installed in a reverse position.

4. A mold foodstuffs and the like as defined in claim 3, wherein said different contours are formed on a single wall potrion of uniform thickness protruding above the normal plane of the wall on one side thereof with a corresponding indentation on the other side thereof.

5. A mold for foodstuffs and the like as defined in claim 3, wherein said central mold portion has walls terminating at an opening therein in an upstanding outwardly flared peripheral flange and in which the side wall portions of said closure are formed with undercut portions and inwardly projecting portion having an inside diameter less than the outside diameter of said outwardly flared flange, whereby the reversible member can be snap-fit on said peripheral flange in liquid sealing relationship.

6. A mold for foodstuffs and the like comprising a central mold portion having walls terminating at one end thereof in a smaller opening and at the other end thereof in a larger opening, said smaller and larger openings terminating in a peripheral edge portion adapted to receive a closure in tight sealing relationship, a reversible closure member for said smaller opening comprising an imperforate central wall connected to a peripheral sleeve forming band having side wall portions thereof extending both upwardly and downwardly from said central wall, whereby closures are formed on both sides of said central wall, said side walls adapted to form a liquid tight seal when installed in sleeve arrangement on said peripheral edge portion, and a closure for said larger end adapted to form a liquid tight seal therewith.

7. A mold for foodstffs and the like, comprising a central mold portion having walls terminating at an opening therein in a peripheral edge portion and a reversible closuring member having a design thereon located to form a decorative design on the foodstuffs in said mold when the closure is either in normal or reversed position and positioned in liquid-tight relationship with said central mold portion.

References Cited

UNITED STATES PATENTS

| D. 206,016 | 10/1966 | Brown. | |
| 2,235,964 | 3/1941 | Meyer et al. | 249—104 X |
| 2,980,039 | 4/1961 | Jolly | 249—134 X |
| 3,128,900 | 4/1964 | Chaboche | 220—27 X |

FOREIGN PATENTS 655,778   1/1963   Canada.

J. SPENCER OVERHOLSER, Primary Examiner

M. O. SUTTON, Assistant Examiner

U.S. Cl. X.R.

220—60